United States Patent
Wu

(10) Patent No.: US 8,549,705 B1
(45) Date of Patent: Oct. 8, 2013

(54) HOLLOW WHEEL SET

(76) Inventor: Chen-Chuan Wu, New Taipei (TW)

( * ) Notice: Subject to any disclaimer, the term of this patent is extended or adjusted under 35 U.S.C. 154(b) by 0 days.

(21) Appl. No.: 13/547,811

(22) Filed: Jul. 12, 2012

(51) Int. Cl.
*A47B 91/06* (2006.01)
*B60B 33/00* (2006.01)

(52) U.S. Cl.
USPC ................................. 16/45; 16/38; 16/31 A

(58) Field of Classification Search
USPC ............... 16/18 R, 18 A, 31 R, 31 A, 45–48,
16/25, 36; 248/346.11; 301/5.1, 5.307, 5.309,
301/5.305, 63.109, 64.702, 64.703, 105.1,
301/106, 108.1, 111.01
See application file for complete search history.

(56) References Cited

U.S. PATENT DOCUMENTS

| | | | | | |
|---|---|---|---|---|---|
| 1,420,190 | A | * | 6/1922 | Hardman | 16/45 |
| 2,476,193 | A | * | 7/1949 | Hirschmugl | 301/5.7 |
| 2,701,740 | A | * | 2/1955 | Norman | 301/5.7 |
| 3,040,371 | A | * | 6/1962 | Rice et al. | 16/31 R |
| 3,977,040 | A | * | 8/1976 | Sugasawara | 16/45 |
| 5,075,924 | A | * | 12/1991 | Estkowski et al. | 16/18 A |
| 5,303,449 | A | * | 4/1994 | Gray | 16/18 CG |
| 6,839,939 | B2 | * | 1/2005 | Donakowski | 16/45 |
| 7,159,278 | B2 | * | 1/2007 | Hilger | 16/102 |
| 2005/0120514 | A1 | * | 6/2005 | Donakowski | 16/45 |
| 2007/0120416 | A1 | * | 5/2007 | Pusch et al. | 301/64.304 |
| 2010/0306962 | A1 | * | 12/2010 | Breyer et al. | 16/46 |
| 2011/0203074 | A1 | * | 8/2011 | Trivini | 16/45 |

* cited by examiner

*Primary Examiner* — Chuck Mah
(74) *Attorney, Agent, or Firm* — Muncy, Geissler, Olds & Lowe, PLLC

(57) ABSTRACT

A hollow wheel set, comprising mainly a wheel rack, a hollow rotation wheel, a restricting sleeve, and a restricting and fastening ring. The wheel rack includes a fixing arm, on said fixing arm is provided with a wheel fork. The hollow rotation wheel is sleeved onto the wheel fork. One end of the restricting sleeve is a sleeve connection portion, while the other end is a ring-shape blocking portion. The sleeve connection portion is sleeved and fixed on the outer perimeter of the wheel fork, and is located between the wheel fork and the hollow rotation wheel. The ring-shape blocking portion is on a side of the hollow rotation wheel. The restricting and fastening ring is fastened around outer perimeter of the wheel fork, and is locate on the other side of the hollow rotation wheel, to reduce size and weight of the hollow wheel set.

6 Claims, 6 Drawing Sheets

HOLLOW WHEEL SET

BACKGROUND OF THE INVENTION

1. Field of the Invention

The present invention relates to a wheel set structure, and in particular to a hollow wheel set structure without the conventional wheel axis, so as to reduce its weight.

2. The Prior Arts

Presently on the market, a kind of wheel set is available for being installed at the bottom of the main body in the following approach to carry weight: a wheel rack 10 having a connection seat 14 and a pair of fixing arms 12 are provided, to match with a wheel 18 with its center having a wheel axis 16, and a through hole 20 is disposed through the pair of fixing arms 12, as shown in FIG. 1. The connection of the wheel 18 and the pair of fixing arms 12 is achieved through using a fixing piece 22 to run through the through hole 20 and wheel 18, and then it is locked and fixed with a positioning piece 24.

However, in such a design structure, the use of a pair of fixing arms 12 will make the production cost of the wheel rack 10 rather high. Moreover, the approach of using the fixing piece 22 having locking threads to lock and fix with the positioning piece 24 could increase the number of elements utilized, and make the overall structure much more complicated. In addition, the disposition of a wheel 18 having a wheel axis 16 could increase the weight of the wheel set.

Therefore, presently, the design and performance of the wheel set of the prior art is not quite satisfactory, and it has much room for improvements.

SUMMARY OF THE INVENTION

In view of the problems and shortcomings of the prior art, the present invention provides a hollow wheel set, without the conventional wheel axis, to reduce the overall weight.

A major objective of the present invention is to provide a hollow wheel set, so that during assembly, fixing pieces having locking threads are not required, to raise the wheel set assembly efficiency significantly.

Another objective of the present invention is to provide a hollow wheel set, wherein only one fixing arm is required, to reduce the cost of wheel rack effectively.

In order to achieve the above-mentioned objective, the present invention provide a hollow wheel set, comprising mainly a wheel rack, a hollow rotation wheel, a restricting sleeve, and a restricting and fastening ring.

The wheel rack includes a fixing arm, on a side wall of the fixing arm is provided with a wheel fork. A hollow rotation wheel is sleeved onto the wheel fork. One end of the restricting sleeve is a sleeve connection portion, while the other end is a ring-shape blocking portion. The sleeve connection portion is sleeved and fixed on the outer perimeter of the wheel fork, and is located between the wheel fork and the hollow rotation wheel. The ring-shape blocking portion is on a side of the hollow rotation wheel. The restricting and fastening ring is fastened around the outer perimeter of the wheel fork, and is locate on the other side of the hollow rotation wheel. The restricting and fastening ring and the ring-shape blocking portion restrict the lateral movement of the hollow rotation wheel.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

Figure 1:
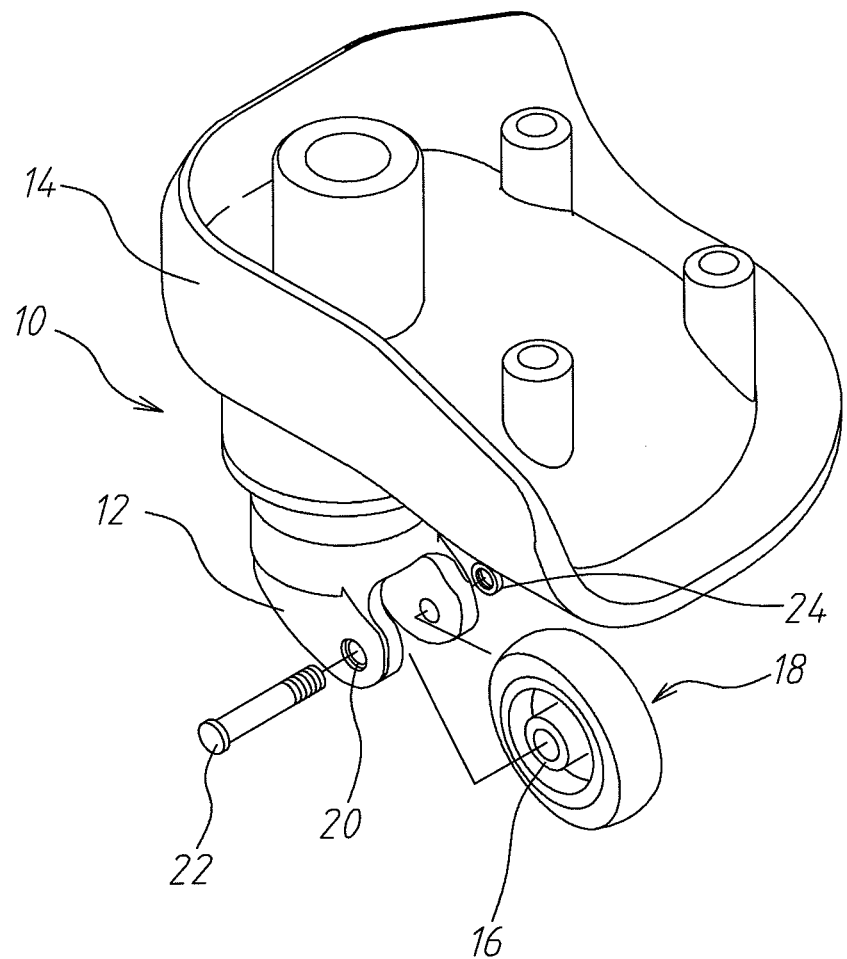
FIG. 1 is a schematic diagram of a wheel set structure at the bottom of the main body for carrying weight according to the prior art.
Figure 2:
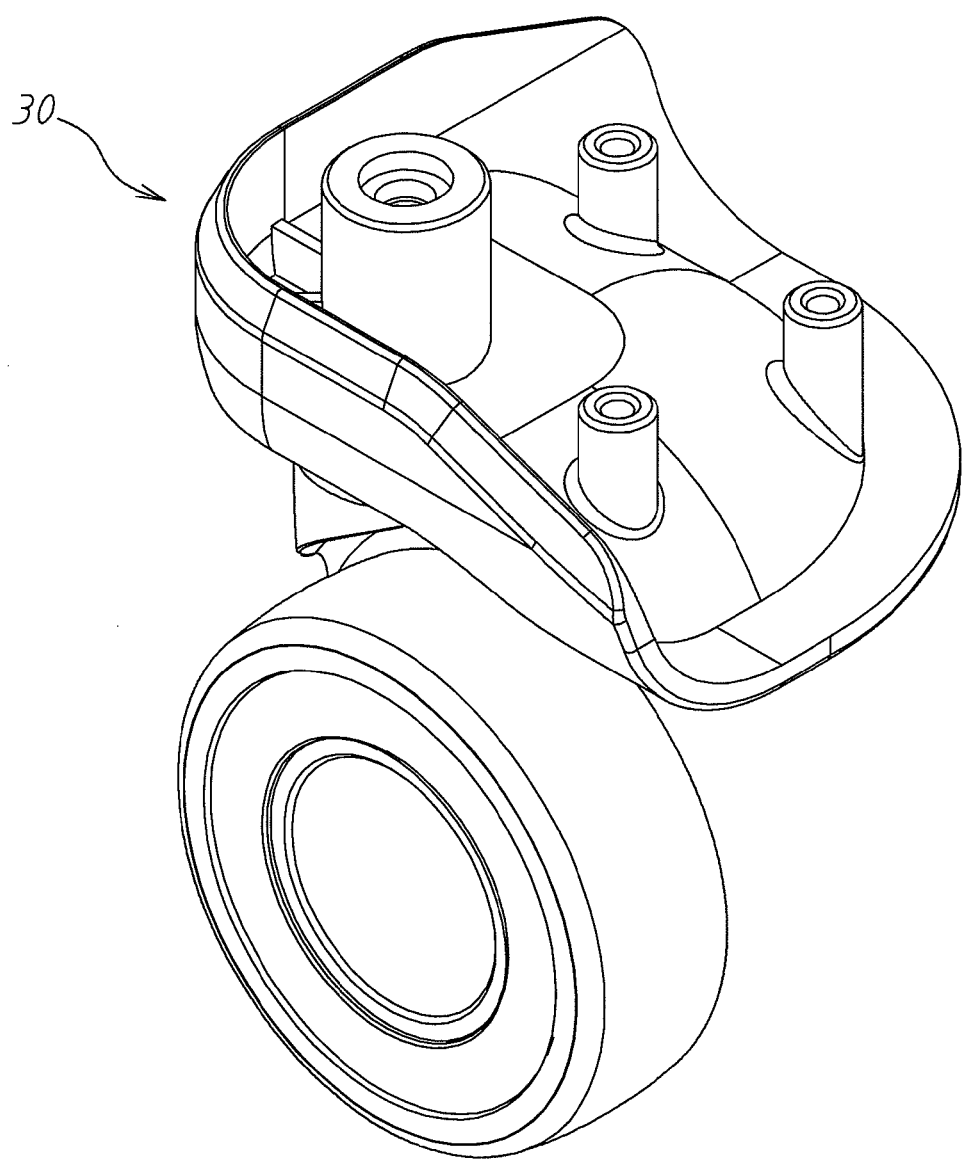
FIG. 2 is a perspective view of a hollow wheel set according to the present invention.
Figure 3:
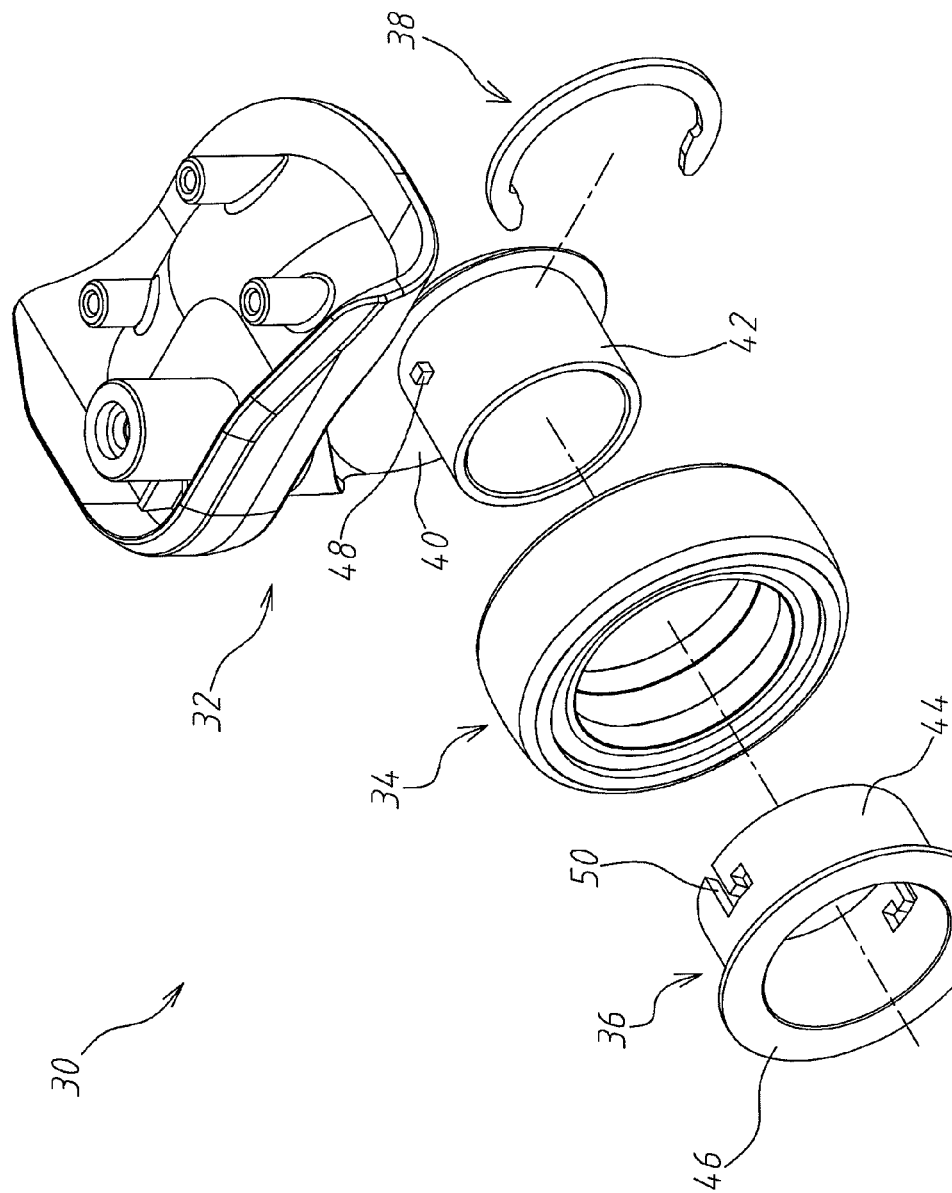
FIG. 3 is an exploded view of a part of elements of a hollow wheel set according to the present invention.

The purpose, construction, features, functions and advantages of the present invention can be appreciated and understood more thoroughly through the following detailed description with reference to the attached drawings. And, in the following, various embodiments are described in explaining the technical characteristics of the present invention.

Refer to FIGS. 2, 3, 4, and 5 respectively for a perspective view, an exploded view of a part of elements, an exploded view of elements, and a cross section view of a hollow wheel set according to the present invention. As shown in FIGS. 2, 3, 4, and 5, the hollow wheel set 30 of the present invention mainly includes a a wheel rack 32, a hollow rotation wheel 34, a restricting sleeve 36, and a restricting and fastening ring 38. The wheel rack 32 includes a fixing arm 40, on a side wall of the fixing arm 40 is provided with a wheel fork 42. The hollow rotation wheel 34 is sleeved onto the wheel fork 42. One end of the restricting sleeve 36 is a sleeve connection portion 44, while the other end is a ring-shape blocking portion 46 protruding outward. The sleeve connection portion 44 is sleeved and fixed onto the outer perimeter of the wheel fork 42 through an open end of the wheel fork 42, and is located between the wheel fork 42 and the hollow rotation wheel 34. The ring-shape blocking portion 46 is located on the left side of the hollow rotation wheel 34. The restricting and fastening ring 38 is fastened around on the outer perimeter of the wheel fork 42, and is on the right side of the hollow rotation wheel 34. The restricting and fastening ring 38 and the ring-shape blocking portion 46 restrict the lateral movement of the hollow rotation wheel 34.

Moreover, the fixing between the wheel fork 42 and the restricting sleeve 36 is realized through a fastening and fixing mechanism. By way of example, as shown in the drawings, the fastening and fixing mechanism can be formed as follows: a set of positioning blocks 48 are disposed on the outer wall of the wheel fork 42 in a protrusion way, a set of positioning slots 50 are disposed on the sleeve connection portion 44 of the restricting sleeve 36, so that through the mutual fastening of the positioning blocks 48 and the positioning slots 50, to achieve fastening the wheel fork 42 and the restricting sleeve 36.

Furthermore, as shown in the drawings, the positioning slot 50 may adopt an L-shape design, while the restricting and fastening ring 38 can be a C-shape clip.

In addition, in the L-shape design of the positioning slot 50, in sleeving and fixing the restricting sleeve 36 onto the outer wall of the wheel fork 42, the opening of the positioning slot 50 must be first aligned with the positioning block 48, then push the restricting sleeve 36 toward the fixing arm 40, to make the positioning block 48 to move along the positioning slot 50 to a first restricting position a, and then rotate the restricting sleeve 36, to make the positioning block 48 to move to the second restricting position b.

In assembling the hollow wheel set 30 of the present invention, the hollow rotation wheel 34 is first sleeved onto the outer wall of the sleeve connection portion 44 of the restricting sleeve 36. Then, the sleeve connection portion 44 is sleeved and fixed onto the outer wall of the wheel fork 42. Subsequently, the restricting and fastening ring 38 is fastened around the outer wall of the wheel fork 42 on the right side of the hollow wheel set 30.

Figure 4:
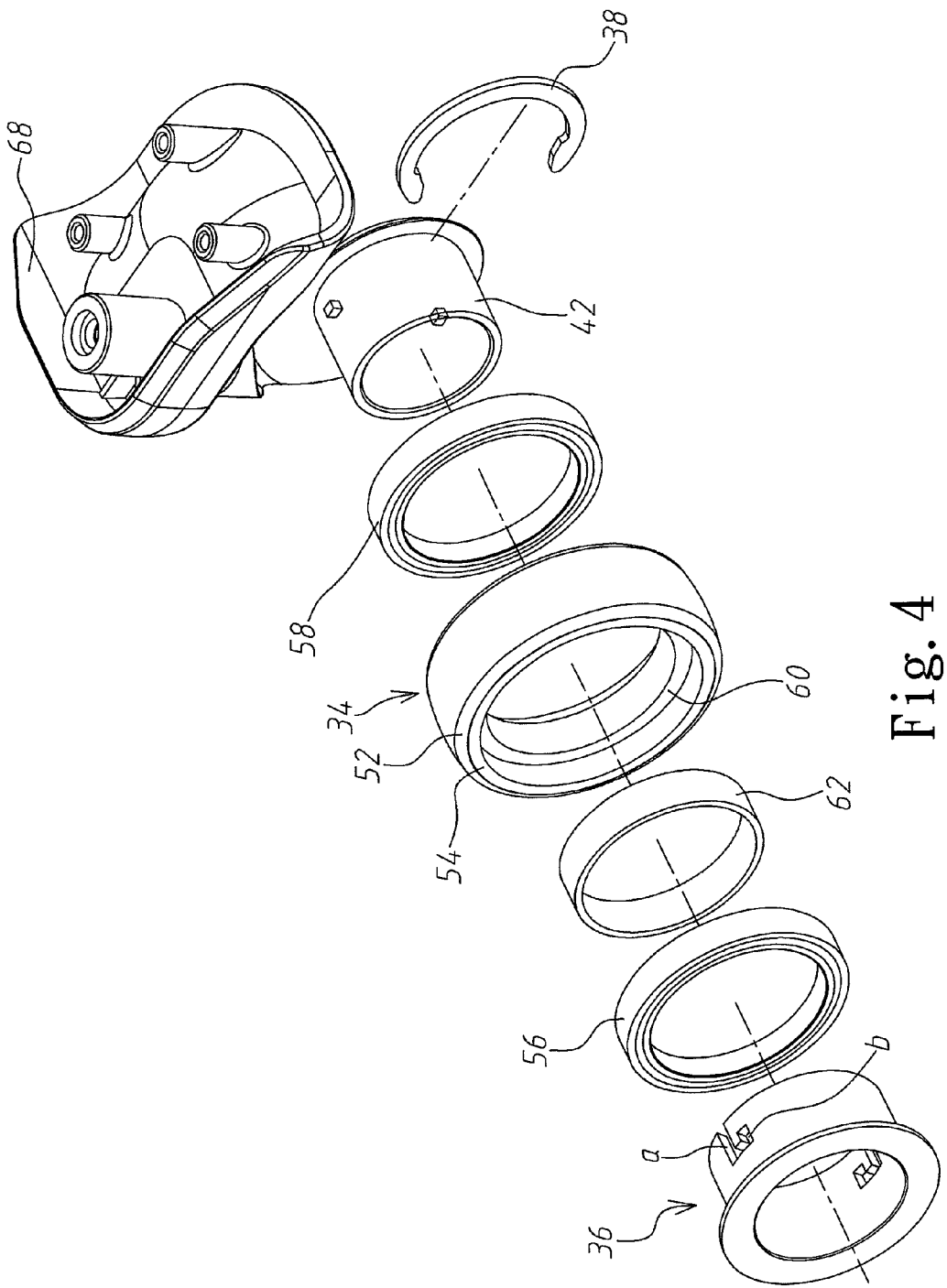
FIG. 4 is an exploded view of elements of a hollow wheel set according to the present invention.
Figure 5:
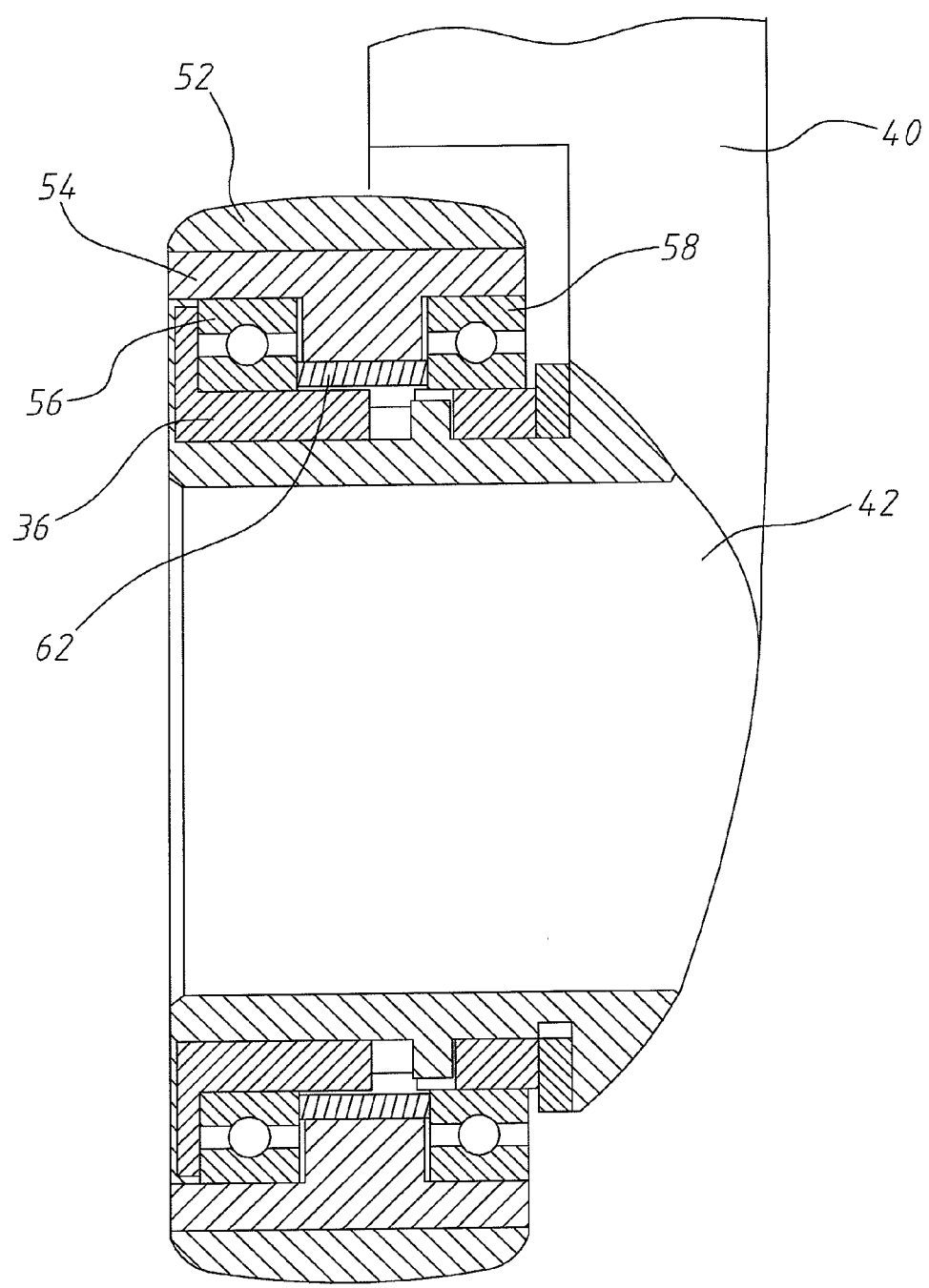
FIG. 5 is a cross section view of a hollow wheel set according to the present invention.

As shown in FIGS. 4 and 5, the hollow rotation wheel 34 mainly includes a hollow wheel frame 54 having a tire 52 provided on its outer wall, a first bearing 56, and a second bearing 58. The inner rim of the hollow wheel frame 54 is provided with a ring-shape protrusion 60. The first bearing 56 and the second bearing 58 is in the receiving space of the hollow wheel frame 54, and is located on two sides of ring-shape protrusion 60.

Moreover, the hollow rotation wheel 34 further includes a partition sleeve 62, disposed on the ring-shape protrusion 60, and between the first bearing 56 and the second bearing 58, to compensate for the size differences between the adjacent elements.

Figure 6:
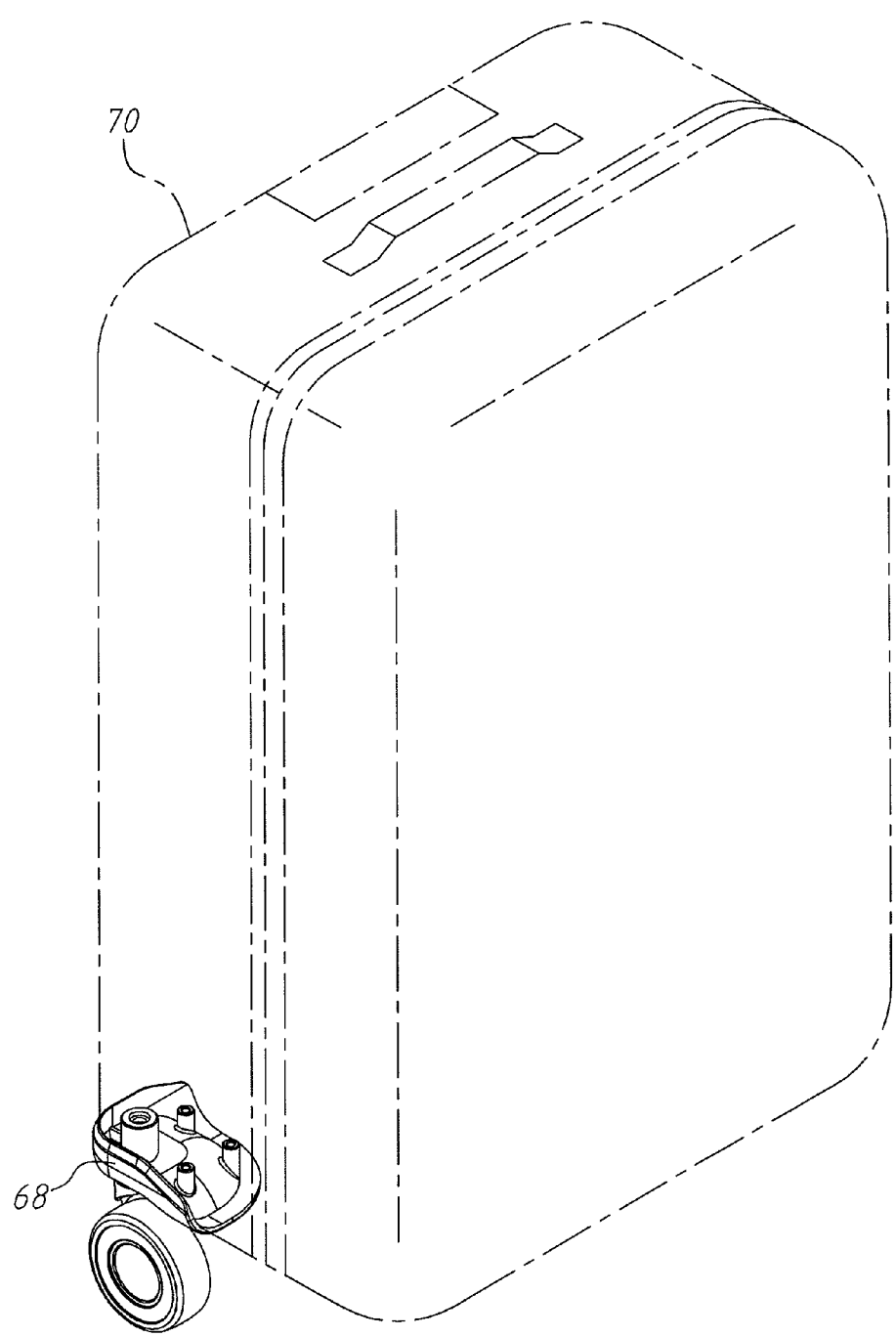
FIG. 6 is a schematic diagram of applying the hollow wheel set of the present invention onto a luggage trunk.

In addition, both the wheel fork 42 and the restricting sleeve 36 are of a hollow design. Furthermore, a shell portion 68 is provided on the wheel rack 32, to be installed on the bottom of a luggage trunk 70, as shown in FIG. 6.

In the design structure of the hollow wheel set, the conventional wheel axis is not required, in realizing reduced overall weight. Moreover, only one fixing arm is required, thus lowering production cost of the wheel rack. In addition, in the present invention, fixing piece having locking threads is not required, hereby reducing complicity of elements utilized, and raising assembling efficiency significantly.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A hollow wheel set, comprising
   a wheel rack, provided with a fixing arm, and cylindrical a wheel fork is disposed on said fixing arm;
   a hollow rotation wheel, rotatably sleeved on said wheel fork;
   a restricting sleeve, with its one end defining a sleeve connection portion, and with its other end defining a ring-shape blocking portion, said sleeve connection portion is sleeved and fixed onto the outer perimeter of said wheel fork, and is located between said wheel fork and said hollow rotation wheel, such that said ring-shape blocking portion is on one side of said hollow rotation wheel; and
   a restricting and fastening ring, fastened around the outer perimeter of said wheel fork, and located on other side of said hollow rotation wheel, said restricting and fastening ring and said ring-shape blocking portion restrict lateral movement of said hollow rotation wheel.

2. The hollow wheel set as claimed in claim 1, wherein a fastening and fixing mechanism is provided between said wheel fork and said restricting sleeve for fastening the wheel fork to the restricting sleeve.

3. The hollow wheel set as claimed in claim 2, wherein said fastening and fixing mechanism includes: a set of positioning blocks disposed on outer wall of said wheel fork in a protrusion way, and a set of L-shape positioning slots provided on said sleeve connection portion of said restricting sleeve to engage with said positioning blocks.

4. The hollow wheel set as claimed in claim 1, wherein said hollow rotation wheel further includes:
   a hollow wheel frame, with its inner rim provided with a ring-shape protrusion;
   a tire, installed on outer perimeter of said hollow wheel frame; and
   a first bearing and a second bearing, disposed in respective receiving spaces on both sides of said ring-shape protrusion.

5. The hollow wheel set as claimed in claim 4, wherein said hollow rotation wheel further includes a partition sleeve, disposed on said ring-shape protrusion, and between said first bearing and said second bearing.

6. The hollow wheel set as claimed in claim 1, wherein a shell portion is further provided on said wheel rack, to be installed on bottom of a luggage trunk.

* * * * *